United States Patent
Tu et al.

(10) Patent No.: US 12,092,583 B2
(45) Date of Patent: Sep. 17, 2024

(54) TAB IMAGE ACQUISITION DEVICE, SYSTEM, AND METHOD

(71) Applicant: CONTEMPORARY AMPEREX TECHNOLOGY CO., LIMITED, Ningde (CN)

(72) Inventors: Yinhang Tu, Ningde (CN); Xingan Liu, Ningde (CN); Yi Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/312,264

(22) Filed: May 4, 2023

(65) Prior Publication Data
US 2024/0003822 A1    Jan. 4, 2024

Related U.S. Application Data

(63) Continuation of application No. PCT/CN2022/102936, filed on Jun. 30, 2022.

(51) Int. Cl.
*G01N 21/88* (2006.01)
*H01M 50/547* (2021.01)

(52) U.S. Cl.
CPC ..... *G01N 21/8806* (2013.01); *G01N 21/8851* (2013.01); *H01M 50/547* (2021.01);
(Continued)

(58) Field of Classification Search
CPC ........... G01N 21/8806; G01N 21/8851; G01N 2021/8835; G01N 2201/0225;
(Continued)

(56) References Cited

U.S. PATENT DOCUMENTS

| 1,027,086 A | * | 5/1912 | Tyler | G01N 21/9501 |
| | | | | 356/237.1 |
| 5,283,668 A | * | 2/1994 | Hiramatsu | H04N 1/1911 |
| | | | | 358/474 |

(Continued)

FOREIGN PATENT DOCUMENTS

| CN | 203464905 U | 3/2014 |
| CN | 108426524 A | 8/2018 |

(Continued)

OTHER PUBLICATIONS

International Search Report for PCT Application No. PCT/CN2022/102936, mailed Dec. 27, 2022.

(Continued)

*Primary Examiner* — Tri T Ton
(74) *Attorney, Agent, or Firm* — Ladas & Parry LLP

(57) ABSTRACT

This application provides a tab image acquisition device, system, and method. The tab image acquisition device includes an image acquisition apparatus, where the image acquisition apparatus includes: a first mobile module movable in a first direction; a second mobile module movable in a second direction, where the second mobile module is installed on the first mobile module and the second direction intersects the first direction; an image acquisition module installed on the second mobile module; and a prism module installed on the first mobile module, where the prism module has a reflective surface, and the reflective surface is configured to change an angle of incident light on a tab whose image is to be acquired, so that the incident light enters the image acquisition module.

13 Claims, 12 Drawing Sheets

(52) U.S. Cl.
CPC ........... *G01N 2021/8835* (2013.01); *G01N 2201/0225* (2013.01); *G01N 2201/0407* (2013.01); *G01N 2201/06146* (2013.01); *G01N 2201/0638* (2013.01)

(58) Field of Classification Search
CPC . G01N 2201/0407; G01N 2201/06146; G01N 2201/0638; H01M 50/547
USPC .... 356/237.1–237.6, 239.1–239.8, 942–943, 356/3.04–4.06, 50.2, 28–37, 141.4, 400, 356/411, 435–444, 222–226
See application file for complete search history.

(56) References Cited

U.S. PATENT DOCUMENTS

| | | | | |
|---|---|---|---|---|
| 9,964,757 | B2* | 5/2018 | Fukumoto | ............ G02B 21/002 |
| 2004/0189936 | A1* | 9/2004 | Mimura | ................ A61B 3/165 |
| | | | | 351/205 |
| 2007/0102478 | A1* | 5/2007 | Prince | ................ B23K 3/0638 |
| | | | | 228/105 |
| 2012/0300053 | A1 | 11/2012 | Kono | |

FOREIGN PATENT DOCUMENTS

| CN | 109738454 A | 5/2019 |
|---|---|---|
| CN | 111965192 A | 11/2020 |
| CN | 113376177 A | 9/2021 |
| CN | 114609153 A | 6/2022 |

OTHER PUBLICATIONS

Liu, Xueshan et al. "Research on battery checkup system based on intelligent camera" (with English Abstract), Machinery Design and Manufacture, vol. 2, Feb. 2011, pp. 5-7.

* cited by examiner

S606

| An image acquisition unit acquires a location image of a battery cell, where a tab is provided on the battery cell | ～S661 |

↓

| Determine a displacement amplitude based on the location image | ～S662 |

TAB IMAGE ACQUISITION DEVICE, SYSTEM, AND METHOD

CROSS REFERENCE TO RELATED APPLICATION

This application is a continuation of International Patent Application No. PCT/CN2022/102936, filed on Jun. 30, 2022, which is incorporated by reference in its entirety.

TECHNICAL FIELD

This application relates to the field of battery technologies, and in particular, to a tab image acquisition device, system, and method.

BACKGROUND

Energy conservation and emission reduction are crucial to sustainable development of the automobile industry. Electric vehicles, with their advantages in energy conservation and emission reduction, have become an important part of sustainable development of the automobile industry. For electric vehicles, battery technology is an important factor in connection with their development.

A battery cell includes tabs. After a battery cell is manufactured, folding status of the tabs needs to be checked. In related technologies, tab images are acquired using a tab image acquisition device, and then folding status of the tabs is checked based on the tab images.

Therefore, it is crucial to obtain clear images of a tab.

SUMMARY

This application is intended to resolve at least one of the technical problems in the background. One objective of this application is to provide a tab image acquisition device, system, and method, so as to relieve problems in related technologies.

An embodiment of a first aspect of this application provides a tab image acquisition device, including an image acquisition apparatus. The image acquisition apparatus includes: a first mobile module movable in a first direction A; a second mobile module movable in a second direction B, where the second mobile module is installed on the first mobile module and the second direction B intersects the first direction A; an image acquisition module installed on the second mobile module; and a prism module installed on the first mobile module, where the prism module has a reflective surface, and the reflective surface is configured to change an angle of incident light on a tab whose image is to be acquired, so that the incident light enters the image acquisition module.

In the technical solution according to this embodiment of this application, the first mobile module and the second mobile module are provided on the image acquisition apparatus, so that the image acquisition module can move in two directions, namely the first direction A and the second direction B. When the tab is displaced, locations of the image acquisition module and the prism module can be changed based on displacement of the tab, so that the application scope of the tab image acquisition device is broadened.

In some embodiments, the first mobile module includes: a first driving unit; a first rail provided on the first driving unit, where the first rail extends in the first direction A; and a first mounting plate provided with a first mounting lug, where the first mounting lug is movably disposed inside the first rail, and both the second mobile module and the prism module are installed on the first mounting plate. The first driving unit drives the first mounting plate to move along the first rail, so as to drive the second mobile module and the prism module to move, and then the image acquisition module is driven by the second mobile module to move in the first direction A.

In some embodiments, the second mobile module includes: a second driving unit installed on the first mounting plate; a second rail provided on the second driving unit, where the second rail extends in the second direction B; and a second mounting plate provided with a second mounting lug, where the second mounting lug is movably disposed inside the second rail, and the image acquisition module is installed on the second mounting plate. The second driving unit drives the second mounting plate to move along the second rail, so as to drive the image acquisition module to move in the second direction B.

In some embodiments, the first direction A is perpendicular to the second direction B. The image acquisition module can move in two directions that are perpendicular to each other. In this case, a location of the image acquisition module can be adjusted more conveniently.

In some embodiments, an included angle between a reflective surface and the first direction A is 45 degrees. The image acquisition module acquires side images of a tab. A battery cell is typically placed horizontally. When the included angle between the reflective surface and the first direction A is 45°, the incident light on a side of the tab can be parallel to the first direction A, and the reflected incident light can be parallel to the second direction B. In this way, it is easier to arrange the location of the prism module, and the incident light on the tab can enter the image acquisition module after being reflected by the reflective surface.

In some embodiments, the prism module includes: a telescopic unit installed on the first mobile module, where a telescoping direction of the telescopic unit is a third direction C, and the third direction C intersects both the first direction A and the second direction B; and a prism body installed on the telescopic unit, where the reflective surface is provided on the prism body. The tab image acquisition device works continuously, the battery cell moves continuously, and a moving path of the battery cell passes through the prism body. To avoid collision between the prism body and the tab, the telescopic unit can be used to control the prism body to move in the third direction C, so that the prism body can avoid from the battery cell, thereby avoiding collision between the prism body and the tab.

In some embodiments, the first direction A, the second direction B, and the third direction C are perpendicular to each other. On one hand, the image acquisition module can move in two directions that are perpendicular to each other. In this case, a location of the image acquisition module can be adjusted more conveniently. On the other hand, the prism body can also move in two directions that are perpendicular to each other, so that the location of the prism body can be adjusted more conveniently.

In some embodiments, the prism body is a total reflecting prism. In this case, an included angle of 45° can be formed between an inclination direction of the reflective surface and the first direction A and the second direction B respectively.

In some embodiments, the image acquisition apparatus further includes: a first light source installed on the first mobile module, where a light-emitting surface of the first light source overlaps at least part of the tab. Light emitted by the first light source irradiates on the tab, so that the image acquisition apparatus can acquire clear images of the tab.

In some embodiments, the first light source is an arc light source. The arc light source has a large irradiation area, ensuring that the light emitted by the first light source irradiates on the tab.

In some embodiments, the tab image acquisition device further includes a displacement detection apparatus, and the displacement detection apparatus is configured to detect a displacement amplitude of the tab in the first direction A. Movement of the first mobile module and the second mobile module is controlled based on the displacement amplitude of the tab.

In some embodiments, the displacement detection apparatus includes at least one image acquisition unit. The image acquisition unit photographs the battery cell to obtain an image of the battery cell, and the displacement amplitude of the tab is determined based on the image of the battery cell.

In some embodiments, the displacement detection apparatus further includes at least one second light source. The second light source can provide light, so that the image acquisition unit can take a clearer image of the battery cell.

An embodiment of a second aspect of this application provides a tab image acquisition system, including at least one pair of the tab image acquisition devices according to any one of the foregoing embodiments. The image acquisition system provided by this embodiment of this application can be used in a broader range.

An embodiment of a third aspect of this application provides a tab image acquisition method that is applied to the tab image acquisition device according to the foregoing embodiments. The method includes: determining a first movement distance of the first mobile module in the first direction A based on a displacement amplitude in the first direction A of a tab whose image is to be acquired; determining a second movement distance of the second mobile module in the second direction B based on the displacement amplitude; controlling the first mobile module to move the first movement distance; controlling the second mobile module to move the second movement distance in the second direction B; and acquiring, by the image acquisition module, at least one image of the tab during a process of controlling the second mobile module to move the second movement distance in the second direction B. This method can control the movement of the image acquisition module based on specific displacement of the tab whose image is to be acquired. In this way, the tab image acquisition device can be used in a broader range. In addition, movement of the prism module can be adjusted based on a spacing between the tabs, which can also broaden the application range of the tab image acquisition device.

In some embodiments, the determining a second movement distance of the second mobile module in the second direction B based on the displacement amplitude includes: determining a start point and an end point of movement of the second mobile module based on the displacement amplitude and a standard value for an operating distance of the image acquisition module. The start point and the end point of movement of the second mobile module are determined based on the displacement amplitude and the standard value for the operating distance of the image acquisition module. This ensures that the image acquisition device can take a clear image from each photographing while moving in the second direction.

In some embodiments, the acquiring, by the image acquisition module, at least one image of the tab during a process of controlling the second mobile module to move the second movement distance in the second direction B includes: acquiring, by the image acquisition module, one image of the tab every time the second mobile module moves a preset distance. The image acquisition module acquires one image of the tab every time the second mobile module moves the preset distance. This can ensure that the image acquisition module can photograph for multiple times to obtain multiple images, and a part of each image is clear. Therefore, a clear side image of the tab can be obtained by fusing the multiple images.

In some embodiments, the preset distance is a fixed value, or the preset distance is a value that varies with a size of the tab. The preset distance can be used to determine the number of photographing times.

In some embodiments, the tab image acquisition device is a tab image acquisition device according to any one of the foregoing embodiments. In addition, the method includes obtaining, by the displacement detection apparatus, the displacement amplitude. The displacement detection apparatus may determine the displacement amplitude of the tab by using an edge extraction algorithm.

In some embodiments, the tab image acquisition device is a tab image acquisition device according to the foregoing embodiments. In addition, the obtaining, by the displacement detection apparatus, the displacement amplitude includes: acquiring, by the image acquisition unit, a location image of a battery cell, where the tab is provided on the battery cell; and determining the displacement amplitude based on the location image. The location image of the battery cell is acquired by the image acquisition unit, and the displacement amplitude of the tab is determined based on the location image. This is easier to implement.

In some embodiments, the battery cell includes a side edge of the battery cell in the first direction A, and the tab includes a first tab edge and a second tab edge that are disposed opposite each other in the first direction A. The determining the displacement amplitude based on the location image includes: determining a first distance between the side edge of the battery cell and the first tab edge based on the location image, and/or determining a second distance between the side edge of the battery cell and the second tab edge based on the location image, and determining the displacement amplitude based on the first distance and/or the second distance. The displacement amplitude can be determined easily based on the distance between the side edge of the battery cell and the first tab edge and the distance between the side edge of the battery cell and the second tab edge.

The foregoing description is merely an overview of the technical solutions in this application. In order to better understand the technical means in this application, to achieve implementation according to content of the specification, and to make the above and other objects, features and advantages in this application more obvious and easy to understand, the following describes specific embodiments of this application.

BRIEF DESCRIPTION OF DRAWINGS

In the accompanying drawings, unless otherwise specified, the same reference signs refer to the same or similar parts or elements throughout the several drawings. These accompanying drawings may not be drawn to scale. It should be understood that these accompanying drawings merely illustrate some embodiments disclosed according to this application and should not be considered as limitations on the scope of this application.

Figure 1:
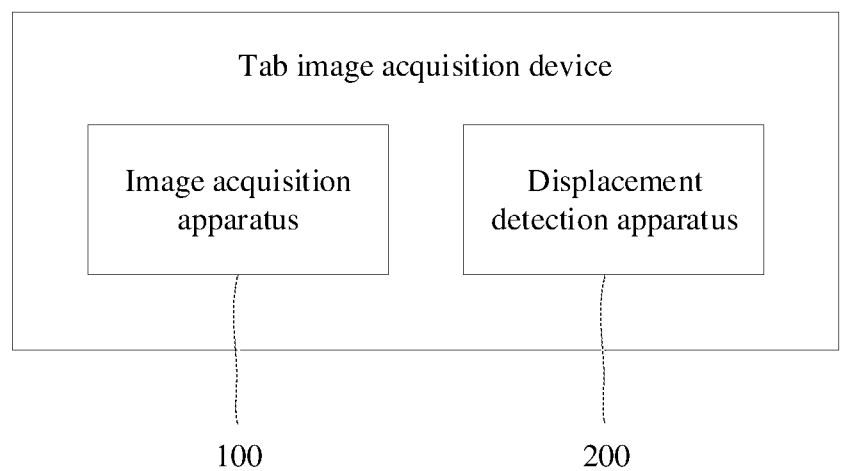
FIG. 1 is a block diagram of a tab image acquisition device according to some embodiments of this application.

Reference signs are described as follows:
1. battery cell;
11. tab;
100. image acquisition apparatus;
10. first mobile module;
101. first driving unit;
102. first rail;
103. first mounting plate;
1031. first mounting lug;
1032. first mounting hole;
20. second mobile module;
201. second driving unit;
202. second rail;
203. second mounting plate;
2031. second mounting lug;
2032. second mounting hole;
30. image acquisition module;
40. prism module;
401. reflective surface;
402. telescopic unit;
403. prism body;
404. cleaning unit;
50. first light source;
501. first subordinate light source;
502. second subordinate light source;
5021. groove;
200. displacement detection apparatus;
300. main mounting plate;
310. main mounting hole; and
320. opening.

DETAILED DESCRIPTION

The following describes in detail the embodiments of technical solutions in this application with reference to the accompanying drawings. The following embodiments are merely used to describe technical solutions in this application more explicitly, and therefore they are merely used as examples and do not constitute limitations on the protection scope of this application.

Unless otherwise defined, all technical and scientific terms used herein shall have the same meanings as commonly understood by those skilled in the art to which this application belongs. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as an indication or implication of relative importance or implicit indication of the number, specific sequence or dominant-subordinate relationship of the technical features indicated. In the description of this application, "a plurality of" means at least two unless otherwise specifically stated.

The term "embodiment" described herein means that specific features, structures or characteristics in combination with descriptions of the embodiments may be incorporated in at least one embodiment of this application. The word "embodiment" in various positions in the specification does not necessarily refer to the same embodiment, or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore shall not be construed as any limitations on embodiments of this application.

In the description of the embodiments of this application, unless otherwise specified and defined explicitly, the technical terms "mount", "connect", "join", and "fasten" should be understood in their general senses. For example, they may refer to a fixed connection, a detachable connection, or an integrated connection, may refer to a mechanical connection or an electrical connection, and may refer to a direct connection, an indirect connection through an intermediate medium, an internal connection between two elements, or an interaction between two elements. Persons of ordinary skill in the art can understand specific meanings of these terms in this application as appropriate to specific situations.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also expanding.

The applicant has noted that folding status of tabs of a battery cell needs to be checked after the battery cell is manufactured to determine the pass rate of the battery cell. In related technologies, a mobile module on a tab image acquisition device drives an image acquisition module to move, and the image acquisition module photographs a tab while moving to obtain images of the tab. The folding status of the tab is determined based on the images of the tab. Displacement may be present on tabs on different battery cells, and therefore positions of the tabs are not specified. In this case, the image acquisition module is required to adjust the location of the image acquisition module based on the specific situation. However, in related technologies, the mobile module on the tab image acquisition device can move only in one direction, and the image acquisition module moves also only in one direction. Therefore, the location of the image acquisition module cannot be adjusted based on different battery cells, which limits the application scope of the tab image acquisition device.

To solve the problem that the application scope of the tab image acquisition device is limited, the applicant has found through research that another mobile module can be added to the tab image acquisition device. That is, a total of two mobile modules are used: a first mobile module and a second mobile module, and a moving direction of the first mobile module intersects a moving direction of the second mobile module. The image acquisition module is installed on the second mobile module, and the second mobile module is installed on the first mobile module. In this way, the image acquisition module can move in two directions. This increases a movement range of the image acquisition module, so that the image acquisition module can adjust its location based on different battery cells. As a result, the application scope of the tab image acquisition device is broadened.

The tab image acquisition device disclosed in the embodiments of this application is configured to acquire tab images of a battery cell. The battery cell may be used in electric apparatuses not limited to vehicles, ships, or aircrafts. The electric apparatus may be but is not limited to a mobile phone, a tablet, a laptop computer, an electric toy, an electric bicycle, an electric vehicle, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

The battery cell is mainly formed by winding or stacking a positive electrode plate and a negative electrode plate, and a separator is generally disposed between the positive electrode plate and the negative electrode plate. Parts of the positive electrode plate and the negative electrode plate, which have active substances constitute a body portion of the battery cell, and parts of the positive electrode plate and the negative electrode plate without active substances constitute tabs separately. A positive electrode tab and a negative electrode tab may both be located at one end of the body portion or be located at two ends of the body portion respectively. During charging and discharging of the battery, a positive electrode active substance and a negative electrode active substance react with an electrolyte, and the tabs are connected to electrode terminals to form a current loop.

Each battery cell may be a secondary battery or a primary battery, a lithium-sulfur battery, a sodium-ion battery, or a magnesium-ion battery, without being limited thereto. The battery cell may be cylindrical, flat, cuboid, or of other shapes.

Figure 2:
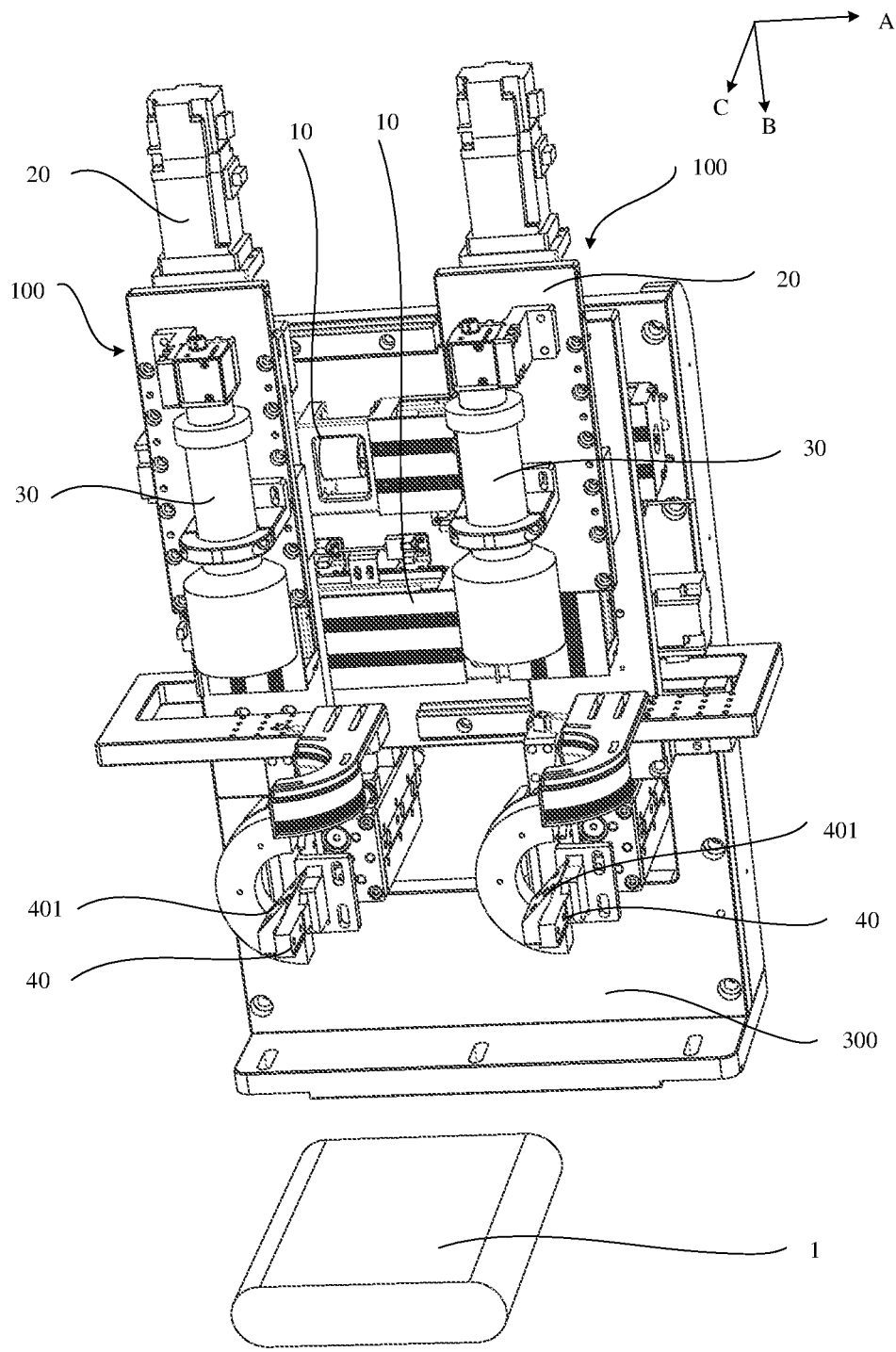
FIG. 2 is a schematic structural diagram of an image acquisition apparatus according to some embodiments of this application.
Figure 3:
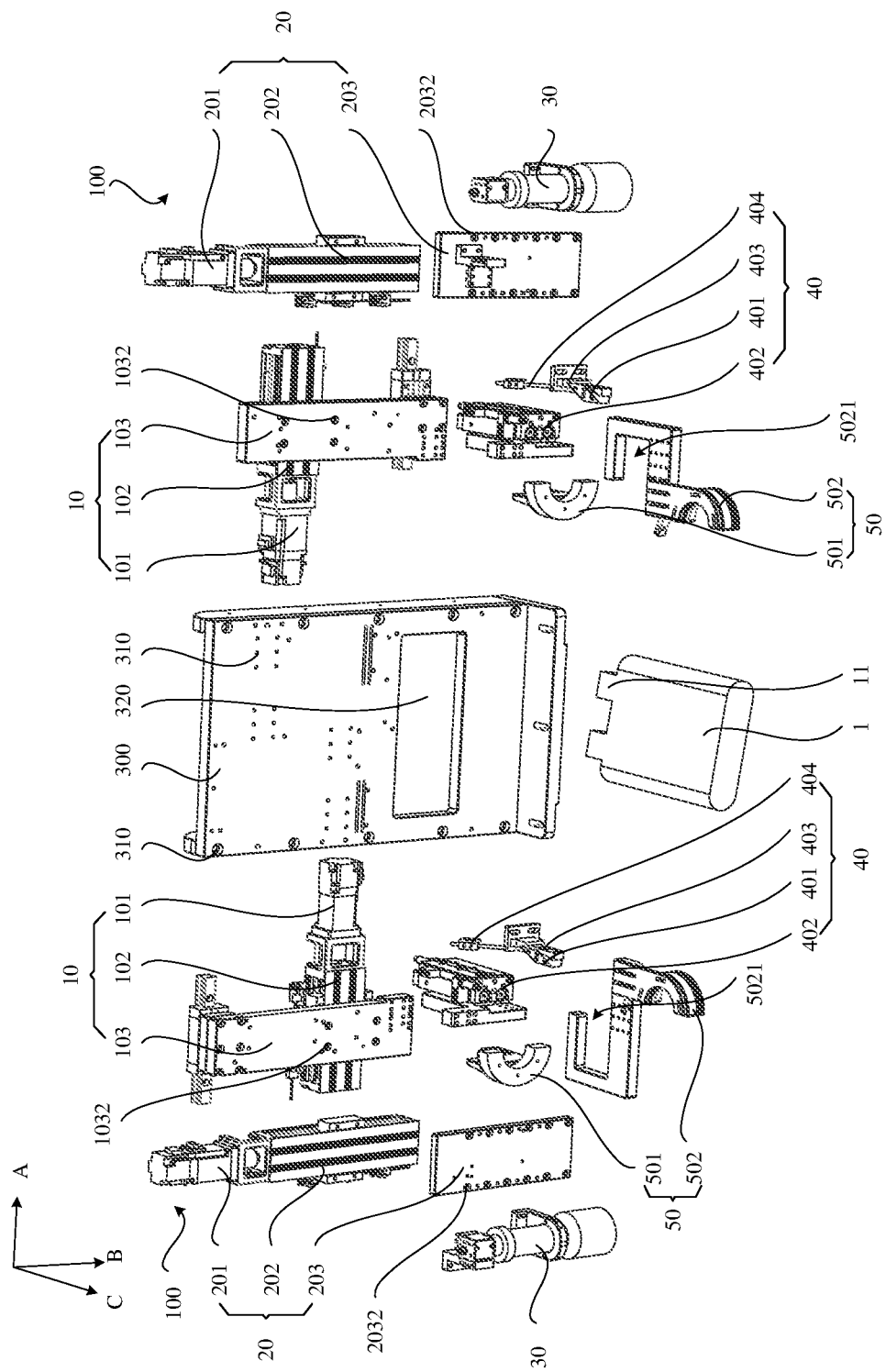
FIG. 3 is a schematic exploded view of an image acquisition apparatus according to some embodiments of this application.

Some embodiments of this application provide a tab image acquisition device. FIG. 1 is a block diagram of a tab image acquisition device according to some embodiments of this application. Referring to FIG. 1, the tab image acquisition device includes an image acquisition apparatus 100. FIG. 2 is a schematic structural diagram of an image acquisition apparatus according to some embodiments of this application. FIG. 3 is a schematic exploded view of an image acquisition apparatus according to some embodiments of this application. Referring to FIG. 2 and FIG. 3, the image acquisition apparatus 100 includes a first mobile module 10, a second mobile module 20, an image acquisition module 30, and a prism module 40. The first mobile module 10 is movable in a first direction A. The second mobile module is movable in a second direction B, where the second mobile module 20 is installed on the first mobile module 10, and the second direction B intersects the first direction A. The image acquisition module 30 is installed on the second mobile module 20. The prism module 40 is installed on the first mobile module 10, where the prism module 40 has a reflective surface 401, and the reflective surface 401 is configured to change an angle of incident light on a tab whose image is to be acquired, so that the incident light enters the image acquisition module 30.

In the embodiments of this application, the image acquisition apparatus 100 is configured to acquire images of the tab. The first mobile module 10 and the second mobile module 20 can move in the first direction A and the second direction B respectively. The second mobile module 20 is installed on the first mobile module 10, and then the second mobile module 20 can move in the first direction A along with the first mobile module 10. The image acquisition module 30 is installed on the second mobile module 20, and then the image acquisition module 30 can move in the second direction B along with the second mobile module 20. In this way, the image acquisition module 30 can move in the first direction A and the second direction B. The prism module 40 is installed on the first mobile module 10, so that the prism module 40 can move in the first direction A.

In an implementation of the embodiments of this application, the image acquisition module 30 may be a charge coupled device (CCD) camera. The CCD camera is small in size, light in weight, unaffected by magnetic fields and features resistance to vibration and impact, which ensures strength and stability of the image acquisition module 30.

In the embodiments of this application, the reflective surface 401 can reflect light. Incident light on the tab whose image is to be acquired enters the image acquisition module after being reflected by the reflective surface 401, so that the image acquisition module can acquire images of the tab.

In the embodiments of this application, the first mobile module 10 and the second mobile module 20 are provided on the image acquisition apparatus 100, so that the image acquisition module 30 can move in two directions, namely the first direction A and the second direction B. When the tab is displaced, locations of the image acquisition module 30 and the prism module 40 can be changed based on displacement of the tab, so that the application scope of the tab image acquisition device is broadened.

Displacement is present on tabs of a battery cell 1, so spacing between the tabs is different for different battery cells. In related technologies, the prism module 40 is unmovable, and the location of the prism module 40 cannot be adjusted based on the spacing between the tabs. In this case, the application scope of the tab image acquisition system is limited. In the embodiments of this application, the prism module 40 is installed on the first mobile module and can move in the first direction A. The tab image acquisition device can adjust the location of the prism module 40 based on changes of the spacing between the tabs, which broadens the application scope of the tab image acquisition device.

Figure 4:
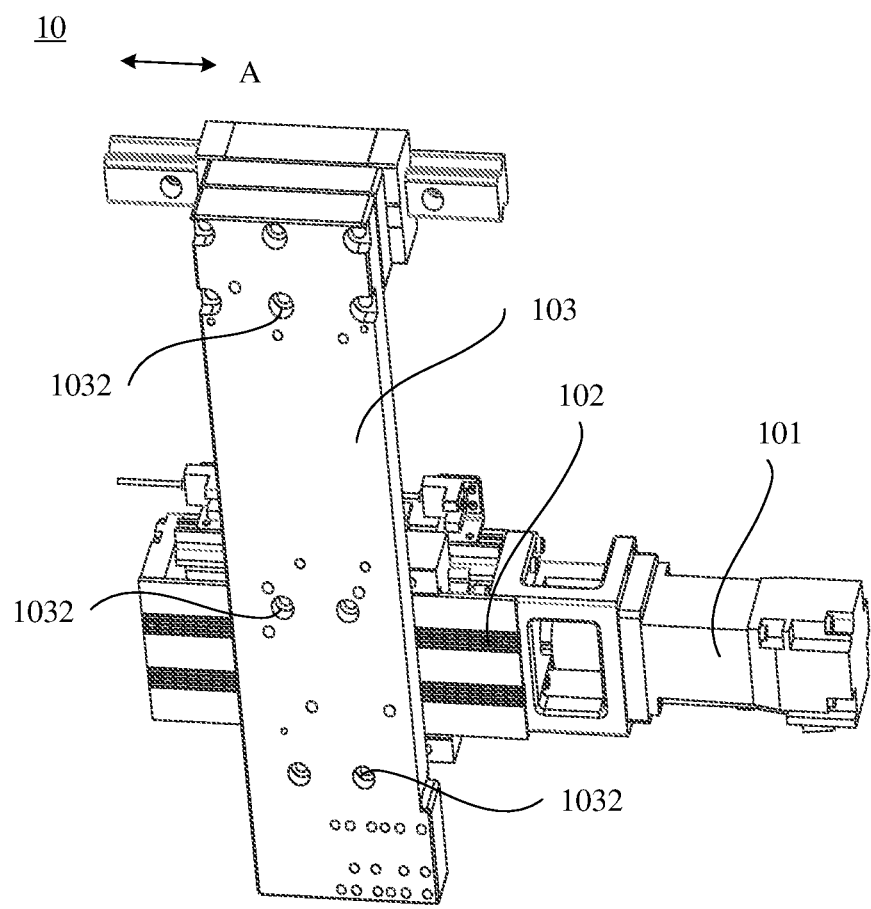
FIG. 4 is a schematic exploded view of a first mobile module according to some embodiments of this application.
Figure 5:
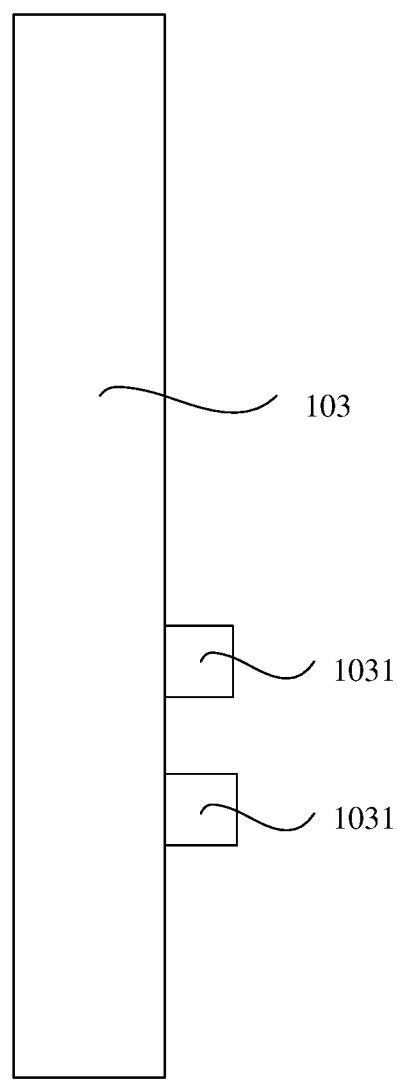
FIG. 5 is a schematic diagram of a first mounting plate according to an embodiment of this application.

According to some embodiments of this application, FIG. 4 is a schematic exploded view of a first mobile module according to some embodiments of this application. Referring to FIG. 4, the first mobile module 10 includes a first driving unit 101, a first rail 102, and a first mounting plate 103. The first rail 102 is provided on the first driving unit 101 and extends in the first direction A. FIG. 5 is a schematic diagram of a first mounting plate according to an embodiment of this application. Referring to FIG. 5, the first mounting plate 103 has a first mounting lug 1031. With reference to FIG. 4 and FIG. 5, the first mounting lug 1031 is movably disposed inside the first rail 102. The second mobile module 20 and the prism module 40 are both installed on the first mounting plate 103.

In the embodiments of this application, the first driving unit 101 is configured to drive the first mounting plate 103 to move, and the second mobile module 20 and the prism module 40 located on the first mounting plate 103 move along with the first mounting plate 103.

In an implementation of the embodiments of this application, the first driving unit 101 may be a pneumatic driving apparatus, a hydraulic driving apparatus, an electric driving apparatus, or a mechanical driving apparatus.

For example, the first driving unit 101 is an electric motor.

In the embodiments of this application, the first rail 102 extends in the first direction A, so that the first mounting plate 103 can move in the first direction A.

In an implementation of the embodiments of this application, the first rail 102 may be a sliding groove on the first driving unit 101; alternatively, the first rail 102 is fastened to the first driving unit 101 via a connecting piece.

In the embodiments of this application, the first driving unit 101 drives the first mounting plate 103 to move along the first rail 102, so as to drive the second mobile module and the prism module 40 to move, and then the image acquisition module 30 is driven by the second mobile module 20 to move in the first direction A.

Still referring to FIG. 3 and FIG. 4, the tab image acquisition device includes two image acquisition apparatuses 100. The tab image acquisition device further includes a main mounting plate 300. The first driving units 101 of the two image acquisition apparatuses 100 are both installed on the main mounting plate 300 to ensure stability of the image acquisition apparatuses 100.

For example, the main mounting plate 300 has a plurality of main mounting holes 310, and the first driving unit 101 has mounting holes corresponding to the main mounting holes 310. Therefore, bolts can be inserted sequentially through the mounting holes on the first driving unit 101 and the main mounting holes 310, and nuts are used to tighten the bolts from the other end. In this way, the first driving unit 101 is fastened to the main mounting plate 300.

Still referring to FIG. 4, the first mounting plate 103 has a plurality of first mounting holes 1032, and the second mobile module 20 and the prism module 40 have corresponding mounting holes. Likewise, bolts and nuts can be used to install the second mobile module 20 and the prism module 40 on the first mounting plate 103.

Figure 6:
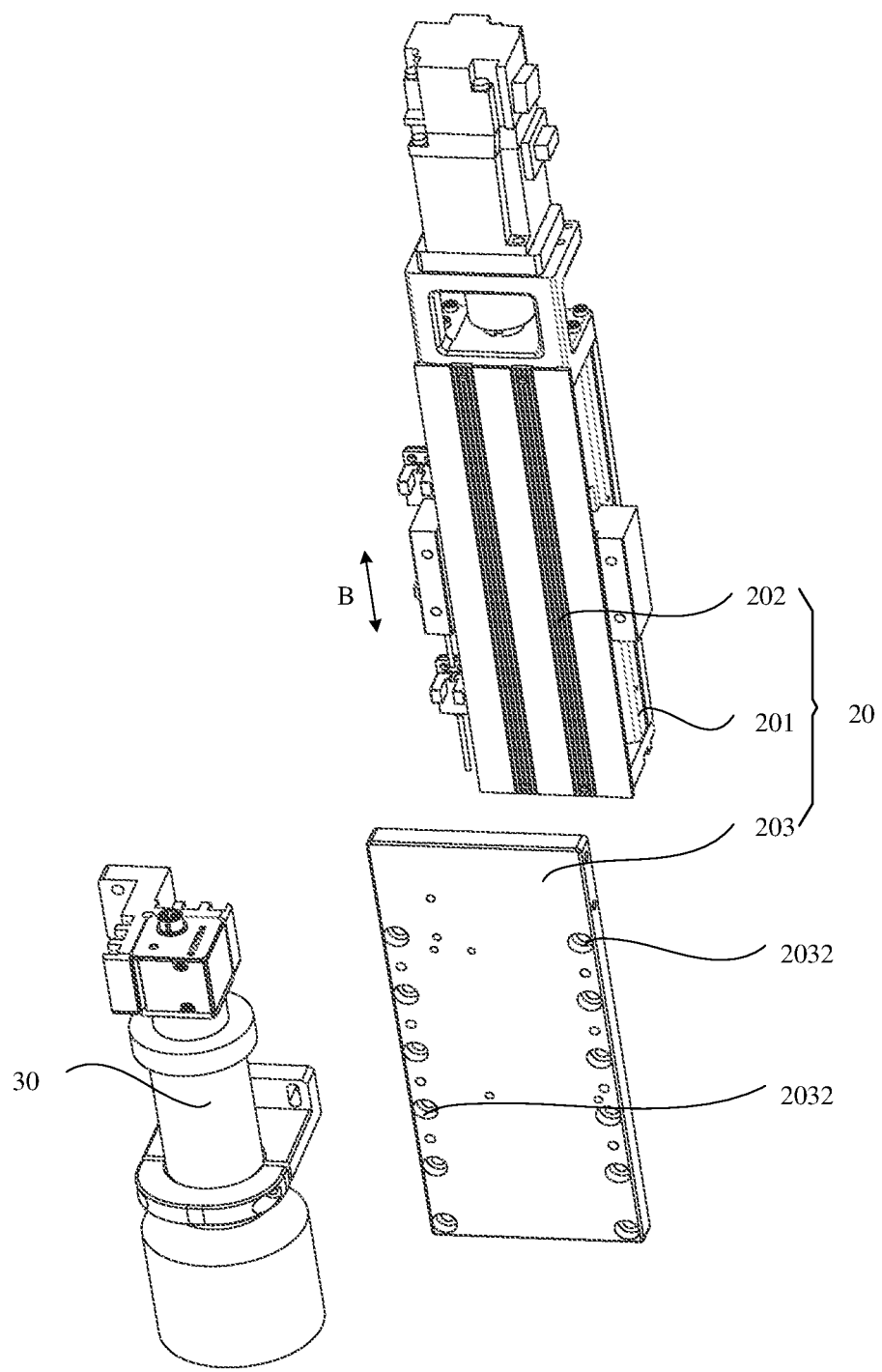
FIG. 6 is a schematic exploded view of a second mobile module and an image acquisition module according to some embodiments of this application.
Figure 7:
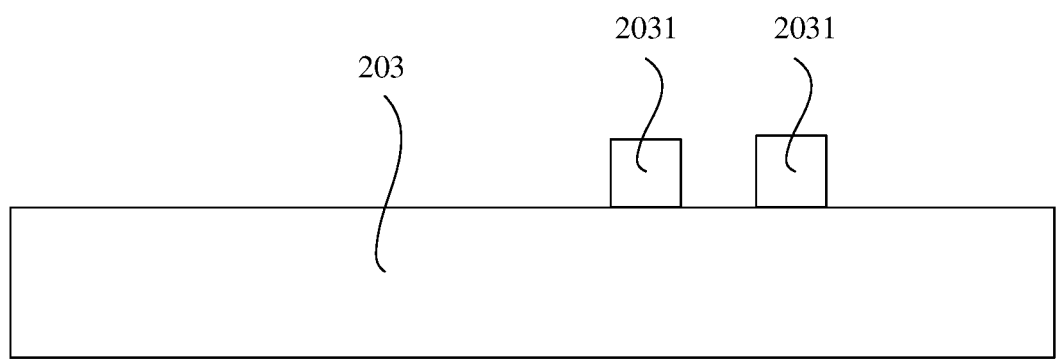
FIG. 7 is a schematic diagram of a second mounting plate according to an embodiment of this application.

According to some embodiments of this application, FIG. 6 is a schematic exploded view of a second mobile module and an image acquisition module according to some embodiments of this application. With reference to FIG. 2, FIG. 3, and FIG. 6, the second mobile module 20 includes a second driving unit 201, a second rail 202, and a second mounting plate 203. The second driving unit 201 is installed on the first mounting plate 103, and the second rail 202 is provided on the second driving unit 201 and extends in the second direction B. FIG. 7 is a schematic diagram of a second mounting plate according to an embodiment of this application. Referring to FIG. 7, the second mounting plate 203 has a second mounting lug 2031. The second mounting lug 2031 is movably disposed inside the second rail 202, and the image acquisition module 30 is installed on the second mounting plate 203.

In the embodiments of this application, the second driving unit 201 is configured to drive the second mounting plate 203 to move, and the image acquisition module 30 located on the second mounting plate 203 moves along with the second mounting plate 203.

In an implementation of the embodiments of this application, the second driving unit 201 may be a pneumatic driving apparatus, a hydraulic driving apparatus, an electric driving apparatus, or a mechanical driving apparatus.

For example, the second driving unit 201 is an electric motor.

In the embodiments of this application, the second rail 202 extends in the second direction B, so that the second mounting plate 203 can move in the second direction B.

In an implementation of the embodiments of this application, the second rail 202 may be a sliding groove on the second driving unit 201; alternatively, the second rail 202 is fastened to the second driving unit 201 by using a connecting piece.

In the embodiments of this application, the second driving unit 201 drives the second mounting plate 203 to move along the second rail 202, so as to drive the image acquisition module 30 to move in the second direction B.

Still referring to FIG. 6, the second mounting plate 203 has a plurality of second mounting holes 2032, and the image acquisition module 30 has mounting holes corresponding to the second mounting holes 2032. Likewise, bolts and nuts can be used to install the image acquisition module 30 on the second mounting plate 203.

According to some embodiments of this application, the first direction A is perpendicular to the second direction B.

For example, when the tab image acquisition device is placed upright, the first direction A is the horizontal direction, and the second direction B is the vertical direction.

In the embodiments of this application, when the first direction A is perpendicular to the second direction B, the image acquisition module 30 can move in the two directions that are perpendicular to each other. In this case, the location of the image acquisition module can be adjusted more conveniently.

According to some embodiments of this application, an included angle between a reflective surface 401 and the first direction A is 45 degrees (°).

In the embodiments of this application, when the first direction A is perpendicular to the second direction B and the included angle between the reflective surface 401 and the first direction A is 45°, an included angle between the reflective surface 401 and the second direction B is 45°.

In an implementation of the embodiments of this application, incident light on the tab is parallel to the first direction A. When the incident light reaches the reflective surface 401, the incident light is parallel to the second direction B after being reflected by the reflective surface 401 and then enters the image acquisition module 30.

In the embodiments of this application, the image acquisition module 30 acquires side images of a tab. A battery cell 1 is generally placed horizontally. When the included angle between the reflective surface 401 and the first direction A is 45°, the incident light on a side of the tab can be parallel to the first direction A, and the reflected incident light can be parallel to the second direction B. In this way, it is easier to arrange the location of the prism module 40, and the incident light on the tab can enter the image acquisition module 30 after being reflected by the reflective surface 401.

Figure 8:
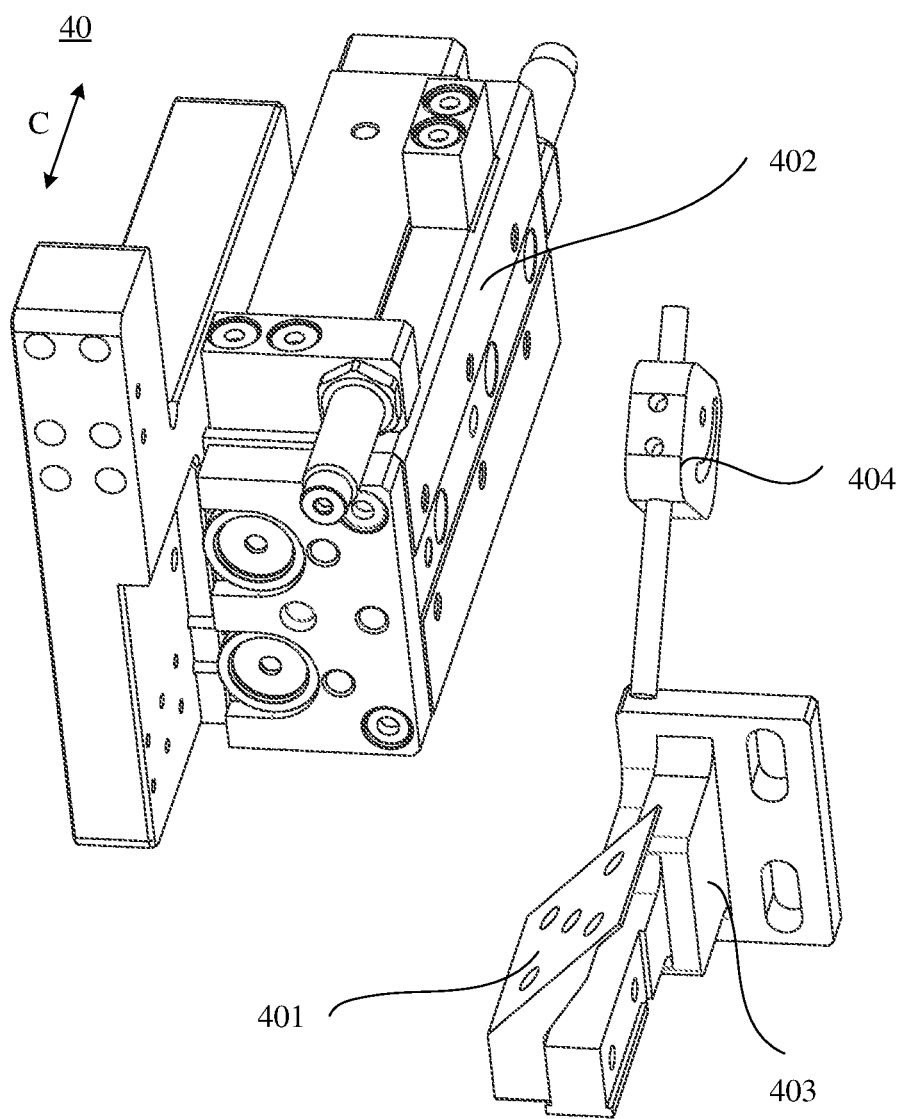
FIG. 8 is a schematic diagram of a prism module according to an embodiment of this application.

According to some embodiments of this application, FIG. 8 is a schematic diagram of a prism module according to an embodiment of this application. Referring to FIG. 8, the prism module 40 includes a telescopic unit 402 and a prism body 403. With reference to FIG. 2, FIG. 3, and FIG. 8, the telescopic unit 402 is installed on the first mobile module 10, and a telescoping direction of the telescopic unit 402 is a third direction C. The third direction C intersects both the first direction A and the second direction B. The prism body 403 is installed on the telescopic unit 402, and the reflective surface 401 is provided on the prism body 403.

In this embodiment of this application, the telescopic unit 402 is used to control the prism body 403 to move in the third direction C, and the prism module 40 moves along with the first mobile module 10. In this way, the prism body 403 can move in the first direction A and the third direction C.

For example, the telescopic unit 402 is a telescopic cylinder.

In this embodiment of this application, the tab image acquisition device works continuously, the battery cell 1 moves continuously, and the moving path of the battery cell 1 passes through the prism body 403. To avoid collision between the prism body 403 and the tab, the telescopic unit 402 can be used to control the prism body 403 to move in the third direction C, so that the prism body 403 can avoid from the battery cell 1, thereby avoiding collision between the prism body 403 and the tab.

For example, the telescopic unit 402 has mounting holes corresponding to the first mounting holes 1032 on the first mounting plate 103, and the telescopic unit 402 can also be install on the first mounting plate 103 by using bolts and nuts.

Still referring to FIG. 3, the main mounting plate 300 has an opening 320 for telescoping of the telescopic unit 402.

For example, the prism body 403 may also be installed on the telescopic unit 402 by using bolts and nuts.

Still referring to FIG. 8, the prism module 40 further includes a cleaning unit 404. The cleaning unit 404 is installed on the telescopic unit 402, and the cleaning unit 404 is configured to clean a mirror face of the reflective surface 401, so as to ensure a clean mirror face and prevent stains or dust on the mirror face from affecting clarity of tab images.

In an implementation of this embodiment of this application, the battery cell 1 is located on a carrying device, and the carrying device may be a conveyor belt, which is convenient for a type of the battery cell 1.

For example, the cleaning unit 404 is a blowing pipe, and a nozzle of the blowing pipe faces the reflective surface 401, and the stains or dust on the mirror face of the reflective surface 401 can be blown away by the air from the blowing pipe to ensure a clean mirror face.

For example, the cleaning unit 404 may also be installed on the telescopic unit 402 by using bolts and nuts.

According to some embodiments of this application, the first direction A, the second direction B, and the third direction C are perpendicular to each other.

In an implementation of this embodiment of this application, when the tab image acquisition device is placed upright, the first direction A and the third direction C are horizontal directions that are perpendicular to each other, and the second direction B is the vertical direction.

In this embodiment of this application, the first direction A, the second direction B, and the third direction C are perpendicular to each other. On one hand, the image acquisition module 30 can move in two directions that are perpendicular to each other. In this case, a location of the image acquisition module can be adjusted more conveniently. On the other hand, the prism body 403 can also move in two directions that are perpendicular to each other, so that the location of the prism body 403 can be adjusted more conveniently.

According to some embodiments of this application, the prism body 403 is a total reflecting prism.

A total reflecting prism is a prism whose cross section is an isosceles right triangle.

In the embodiments of this application, when the prism body 403 is a total reflecting prism, an included angle of 45° can be formed between an inclination direction of the reflective surface 401 and the first direction A and the second direction B respectively.

According to some embodiments of this application, refer to FIG. 2 and FIG. 3. The image acquisition apparatus 100 further includes a first light source 50. The first light source 50 is installed on the first mobile module 10, and a light-emitting surface of the first light source 50 overlaps at least part of the tab.

In the embodiments of this application, the first light source 50 is installed on the first mobile module 10. The first light source 50 can move along with the first mobile module 10, that is, a moving direction of the first light source 50 is the first direction A.

In the embodiments of this application, light emitted by the first light source 50 irradiates on the tab, so that the image acquisition apparatus can acquire clear images of the tab.

According to some embodiments of this application, the first light source 50 is an arc light source.

In the embodiments of this application, the arc light source is a light source whose light-emitting surface is arc-shaped.

The arc light source has a large irradiation area, ensuring that the light emitted by the first light source 50 irradiates on the tab.

Referring to FIG. 3, the first light source 50 includes a first subordinate light source 501 and a second subordinate light source 502. A light-emitting surface of the first subordinate light source 501 is parallel to the second direction B, a light-emitting surface of the second subordinate light source 502 is parallel to the first direction A, and the first subordinate light source 501 and the second subordinate light source 502 illuminate the tab from two directions, further improving clarity of tab images.

With reference to FIG. 2 and FIG. 3, the first subordinate light source 501 is installed on the telescopic unit 402, and the second subordinate light source 502 is installed on the first mounting plate 103. For example, the first subordinate light source 501 may be installed on the telescopic unit 402 by using bolts and nuts, and the second subordinate light source 502 may be installed on the first mounting plate 103 by using bolts and nuts.

To prevent the second subordinate light source 502 from affecting movement of the second mobile module 20, the second subordinate light source 502 provides a groove 5021 for the second mobile module 20 to move on.

According to some embodiments of this application, still referring to FIG. 1, the tab image acquisition device further includes a displacement detection apparatus 200, and the displacement detection apparatus 200 is configured to detect a displacement amplitude of the tab in the first direction A.

In the embodiments of this application, the displacement detection apparatus 200 can detect a displacement amplitude of a tab and control movement of the first mobile module and the second mobile module 20 based on the displacement amplitude of the tab.

According to some embodiments of this application, the displacement detection apparatus 200 includes at least one image acquisition unit.

In the embodiments of this application, the image acquisition unit photographs the battery cell 1 to obtain an image of the battery cell 1, and the displacement amplitude of the tab is determined based on the image of the battery cell 1.

For example, the displacement detection apparatus 200 may include one or more image acquisition units.

For example, the image acquisition unit may be a CCD camera.

According to some embodiments of this application, the displacement detection apparatus 200 further includes at least one second light source.

For example, the second light source may be an arc light source.

For example, the displacement detection apparatus 200 may include one or more second light sources.

In the embodiments of this application, the second light source can provide light, so that the image acquisition unit can take a clearer image of the battery cell.

An embodiment of this application provides a tab image acquisition device. The tab image acquisition device includes two tab image acquisition apparatuses 100 and one main mounting plate 300. The two tab image acquisition apparatuses 100 are installed on the main mounting plate 300. The tab image acquisition apparatus 100 includes a first mobile module 10, a second mobile module 20, an image acquisition module 30, a prism module 40, and a first light source 50.

The first mobile module 10 includes: a first driving unit 101, a first rail 102, and a first mounting plate 103. The first rail 102 is provided on the first driving unit 101 and extends in a first direction A. The first mounting plate 103 is provided with a first mounting lug 1031, and the first mounting lug 1031 is movably disposed inside the first rail 102. The second mobile module 20, the prism module 40, and the first light source 50 are all installed on the first mounting plate 103. The first driving unit 101 is an electric motor.

The second mobile module 20 includes a second driving unit 201, a second rail 202, and a second mounting plate 203. The second driving unit 201 is installed on the first mounting plate 103. The second rail 202 is provided on second driving unit 201 and extends in a second direction B. The second mounting plate 203 is provided with a second mounting lug 2031, and the second mounting lug 2031 is movably disposed inside the second rail 202. The image acquisition module 30 is installed on the second mounting plate 203. The second driving unit 201 is an electric motor.

The image acquisition module 30 is a CCD camera.

The prism module 40 includes a telescopic unit 402, a prism body 403, and a cleaning unit 404. The telescopic unit 402 is installed on the first mobile module 10, and a telescoping direction of the telescopic unit 402 is a third direction C. The third direction C, the first direction A, and the second direction B are perpendicular to each other. Both the prism body 403 and the cleaning unit 404 are installed on the telescopic unit 402, and a reflective surface 401 is provided on the prism body 403. The reflective surface 401 is provided on the prism body 403. The prism body 403 is a total reflecting prism, the telescopic unit 402 is a telescopic cylinder, and the cleaning unit 404 is a blowing pipe.

A light-emitting surface of the first light source 50 overlaps at least part of the tab. The first light source 50 is an arc light source, including a first subordinate light source 501 and a second subordinate light source 502. A light-emitting surface of the first subordinate light source 501 is parallel to the second direction B, and a light-emitting surface of the second subordinate light source 502 is parallel to the first direction A. The first subordinate light source 501 is installed on the telescopic unit 402, the second subordinate light source 502 is installed on the first mounting plate 103, and the second subordinate light source 502 provides a groove 5021 for the second mobile module 20 to move on.

An embodiment of this application provides a tab image acquisition system, including at least one pair of the tab image acquisition devices according to the foregoing embodiment.

For example, the tab image acquisition device includes one displacement detection apparatus 200 and two image acquisition apparatuses 100. The reflective surfaces 401 of the two image acquisition apparatuses 100 on a tab image acquisition device have the same inclination angle. The tab image acquisition system includes two tab image acquisition devices. Inclination angles of reflective surfaces of the two tab image acquisition devices intersect.

In this embodiment of this application, the tab image acquisition system is configured to acquire images of a tab.

In this embodiment of this application, one tab image acquisition device includes two image acquisition apparatuses 100. One of the two image acquisition apparatuses 100 acquires images of a first side surface of a positive electrode tab of a battery cell, and the other one of the two image acquisition apparatuses 100 acquires images of a second side surface of a negative electrode tab of the battery cell. If the first side surface is a right side surface of the positive electrode tab, the second side surface is a right side surface of the negative electrode tab. If the first side surface is a left side surface of the positive electrode tab, the second side surface is a left side surface of the negative electrode tab. That is, the two image acquisition apparatuses 100 acquire images of surfaces of the positive electrode tab and the negative electrode tab on the same side.

In this embodiment of this application, one tab image acquisition system includes two tab image acquisition devices, and the two tab image acquisition devices acquire images of two opposite side surfaces of a tab respectively.

Figure 9:
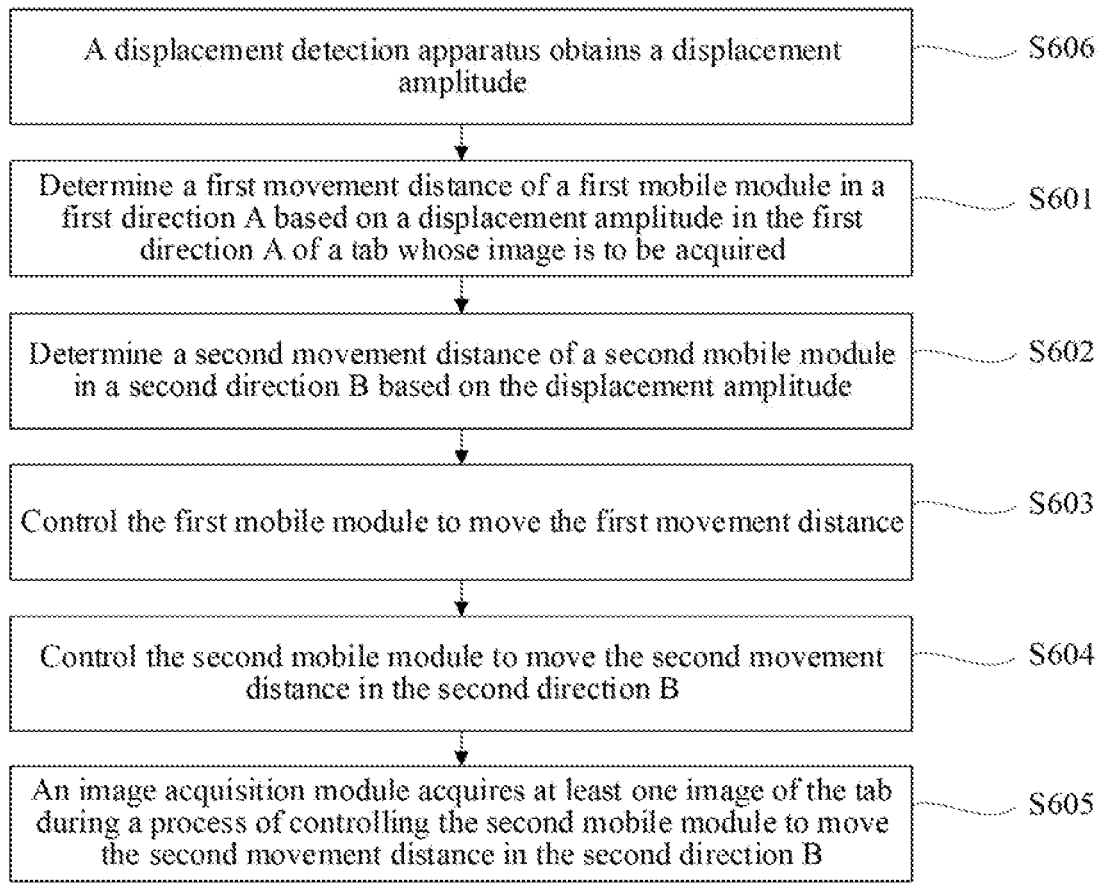
FIG. 9 is a simple schematic diagram of a tab image acquisition method according to an embodiment of this application.

Some embodiments of this application provide a tab image acquisition method, applied to the tab image acquisition device according to any one of the embodiments. FIG. 9 is a flowchart of a tab image acquisition method according to an embodiment of this application. Referring to FIG. 9, the method includes the following steps.

Step S601. Determine a first movement distance of the first mobile module in the first direction A based on a displacement amplitude in the first direction A of a tab whose image is to be acquired.

Step S602. Determine a second movement distance of the second mobile module in the second direction B based on the displacement amplitude.

Step S603. Control the first mobile module to move the first movement distance.

Step S604. Control the second mobile module to move the second movement distance in the second direction B.

Step S605. The image acquisition module acquires at least one image of the tab during a process of controlling the second mobile module to move the second movement distance in the second direction B.

Figures 10, 11:
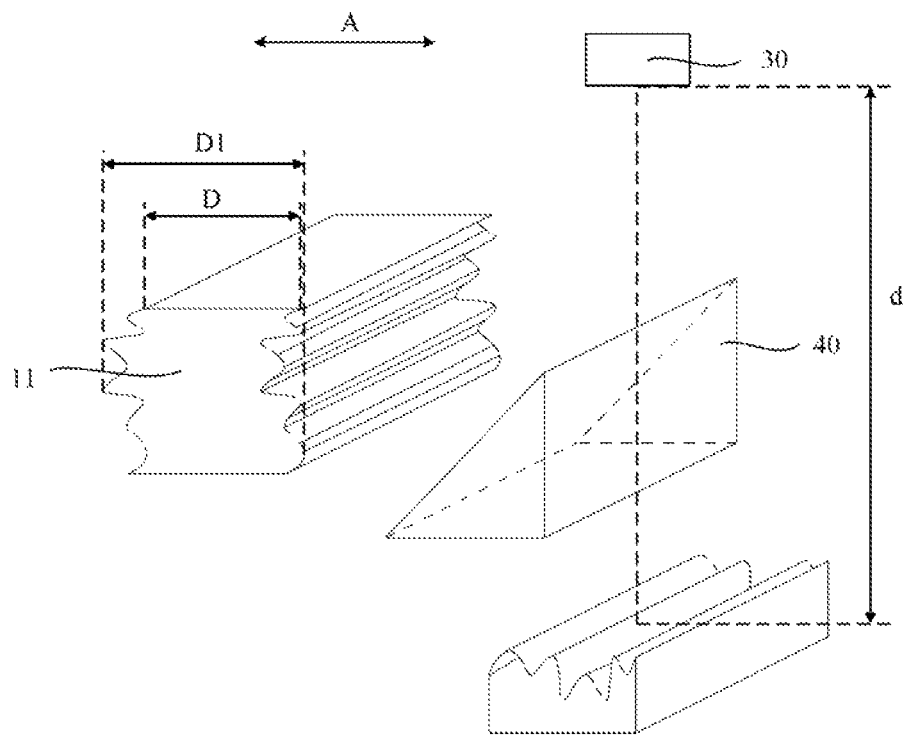
FIG. 10 is a flowchart of a tab image acquisition method according to an embodiment of this application.
FIG. 11 is a flowchart of a tab image acquisition method according to an embodiment of this application.

FIG. 10 is a simple schematic diagram of a tab image acquisition method according to an embodiment of this application. Referring to FIG. 10, a battery cell includes a plurality of tab sheets that are stacked, and the plurality of tab sheets constitute a tab 11. The stacked tab sheets may be displaced differently in the first direction A so that a side surface of the tab 11 is a curved surface. A clear imaging focal length (a standard value d for an operating distance) of the image acquisition module 30 is a fixed value, and clear images can be obtained only when a distance between the side surface of the tab 11 and the image acquisition module 30 is equal to the imaging focal length. The side surface of the tab 11 is a curved surface, so that a distance between each position on the side surface of the tab 11 and the image acquisition module 30 is different. In this case, the location of the image acquisition module 30 needs to be changed based on displacement of each tab sheet.

In this embodiment of this application, the displacement amplitude of the tab is determined based on a reference battery cell. All tab sheets of the reference battery cell are not displaced, and the tab whose image is to be acquired is displaced with respect to tabs of the reference battery cell, and a distance of displacement is the displacement amplitude.

The first movement distance of the first mobile module needs to be determined based on a maximum displacement amplitude of the tab 11 in the first direction A. The second movement distance of the second mobile module needs to be determined based on a range of displacement in the first direction A.

In this embodiment of this application, the first mobile module is first controlled to move the first movement distance in the first direction A based on the maximum displacement amplitude of the tab 11 in the first direction A. In this case, the second mobile module, the image acquisition module, and the prism module all move the first movement distance along with the first mobile module. Then, the second mobile module is controlled to move the second movement distance in the second direction B based on the range of displacement of the tab 11 in the first direction A. In this case, the image acquisition module moves the second movement distance along with the second mobile module. The image acquisition module acquires at least one image of the tab during a process of moving in the second direction. This method can control the movement of the image acquisition module based on specific displacement of the tab whose image is to be acquired. In this way, the tab image acquisition device can be used in a broader range. In addition, movement of the prism module can be adjusted based on a spacing between the tabs, which can also broaden the application range of the tab image acquisition device.

According to some embodiments of this application, step S604 includes determining a start point and an end point of movement of the second mobile module based on the displacement amplitude and a standard value for an operating distance of the image acquisition module.

In the embodiments of this application, the standard value for an operating distance of the image acquisition module is the clear imaging focal length of the image acquisition module. Only when the actual imaging distance is equal to the clear imaging focal length, the image acquisition apparatus can acquire clear tab images.

In the embodiments of this application, the start point and the end point of movement of the second mobile module are determined based on the displacement amplitude and the standard value for the operating distance of the image acquisition module. This ensures that the image acquisition device can take a clear image from each photographing while moving in the second direction.

According to some embodiments of this application, step S605 includes acquiring, by the image acquisition module, one image of the tab every time the second mobile module moves a preset distance.

In the embodiments of this application, when the image acquisition apparatus moves in the second direction B along with the second mobile module, the imaging distance from only one position is equal to the clear imaging focal length. That is, only part of an image taken from each photographing by the image acquisition module is clear. Therefore, the image acquisition module needs to photograph for multiple times when the image acquisition apparatus moves in the second direction B along with the second mobile module, so that a clear side image of the tab can be obtained by fusing multiple images acquired.

In the embodiments of this application, the image acquisition module acquires one image of the tab every time the second mobile module moves the preset distance. This can ensure that the image acquisition module can photograph for multiple times to obtain multiple images, and a part of each image is clear. Therefore, a clear side image of the tab can be obtained by fusing the multiple images.

According to some embodiments of this application, the preset distance is a fixed value, or the preset distance is a value that varies with a size of the tab.

In the embodiments of this application, the preset distance may be a fixed empirical value or a value that varies with the size of the tab.

In an implementation of the embodiments of this application, the preset distance is equal for a same tab.

According to some embodiments of this application, still referring to FIG. 9. the method includes the following steps.

Step S606. The displacement detection apparatus obtains the displacement amplitude.

In the embodiments of this application, the displacement detection apparatus may determine the displacement amplitude of the tab by using an edge extraction algorithm.

According to some embodiments of this application, FIG. 11 is a flowchart of a tab image acquisition method according to an embodiment of this application. Referring to FIG. 11, step S606 includes the following steps.

Step S661. The image acquisition unit acquires a location image of a battery cell, where the tab is provided on the battery cell.

Step S662. Determine the displacement amplitude based on the location image.

In this embodiment of this application, the location image of a battery cell is acquired by the image acquisition unit, and the displacement amplitude of the tab is determined based on the location image. This is easier to implement.

According to some embodiments of this application, the battery cell includes a side edge of the battery cell in the first direction A, and the tab includes a first tab edge and a second tab edge that are disposed opposite each other in the first direction A. The determining the displacement amplitude based on the location image includes: determining a first distance between the side edge of the battery cell and the first tab edge based on the location image, and/or determining a second distance between the side edge of the battery cell and the second tab edge based on the location image, and determining the displacement amplitude based on the first distance and/or the second distance.

In the embodiments of this application, a first distance between the side edge of the battery cell and the first tab edge is a maximum displacement amplitude of the tab, and a difference between the first distance and the second distance is a range of displacement of the tab.

To describe more clearly the tab image acquisition method according to the embodiments of this application, the following uses an example for description.

Figure 12:
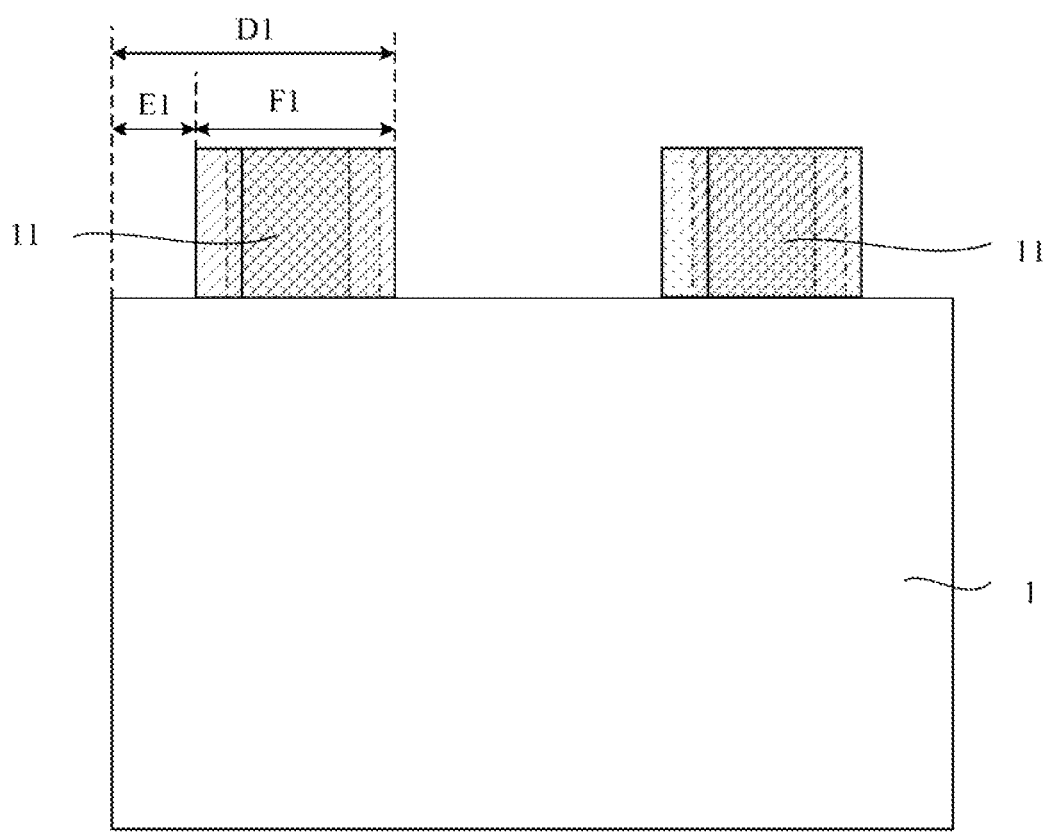
FIG. 12 is a schematic diagram of a reference battery cell according to an embodiment of this application.

FIG. 12 is a flowchart of a tab image acquisition method according to an embodiment of this application. Referring to FIG. 12, a battery cell 1 has two tabs 11: a positive electrode tab and a negative electrode tab. For ease of description, a right side surface of the positive electrode tab on the left is used as an example for description in this embodiment of this application. When an image of the right side surface needs to be acquired, the prism module is located on the right side of the tab, as shown in FIG. 12.

Step 1. Obtain parameters of a reference battery cell to determine a reference tab width D, a reference first distance E between a side edge of the reference battery cell and the first tab edge, a reference second distance F between the side edge of the reference battery cell and the second tab edge, a reference photographing start position $S_{start}$ of the second mobile module in the second direction, a preset distance G, and a reference number of photographing trigger times N.

Figure 13:
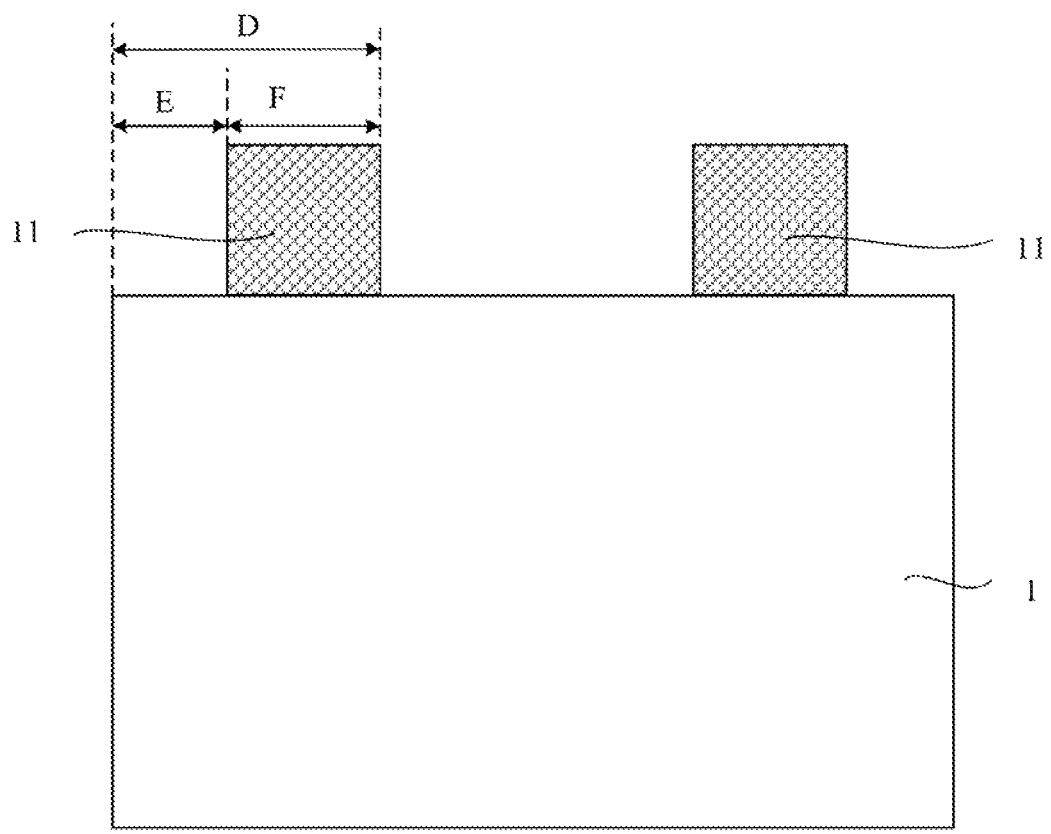
FIG. 13 is a schematic diagram of a reference battery cell according to an embodiment of this application.

In the embodiments of this application, FIG. 13 is a schematic diagram of a reference battery cell according to an embodiment of this application. Refer to FIG. 13. The reference tab width D, the reference first distance E, and the reference second distance F can be clearly observed. The reference tab width D, the reference first distance E, the reference second distance F, reference photographing start position $S_{start}$, the preset distance G, and the reference number of photographing trigger times N are all already known. They may be stored in a tab image acquisition system, and fetched from the tab image acquisition system for use.

Step 2. Determine a reference photographing end position $S_{end}$ of the second mobile module in the second direction based on the reference photographing start position $S_{start}$, the reference first distance E, and the reference number of photographing trigger times N, where reference photographing end position $S_{end}=S0+G*N$.

Step 3. The image acquisition unit on the displacement detection apparatus acquires images of the battery cell and determines a displacement amplitude of the tab based on the images of the battery cell.

In this embodiment of this application, an edge extraction algorithm is used to determine width D1 of the tab whose image is to be acquired, a first distance E1 between the side edge of the battery cell and the first tab edge, and a second distance F1 between the side edge of the battery cell and the second tab edge. The displacement amplitude of the tab includes $\Delta D=D1-D$, $\Delta E=E1-E$, and $\Delta F=F1-F$.

Step 4. Determine a first movement distance of a first mobile apparatus and a second movement distance of a second mobile apparatus based on the displacement amplitude of the tab.

The first displacement amplitude is $\Delta F=F1-F$, and the second displacement amplitude includes $\Delta D=D1-D$ and $\Delta E=E1-E$.

Step 5. Control the first mobile apparatus to move the first movement distance in the first direction.

In this embodiment of this application, if $\Delta F>0$, it indicates that the right side of the tab is entirely displaced to the right, and the first mobile apparatus needs to be controlled to move the first movement distance to the right; if $\Delta F<0$, it indicates that the right side of the tab is entirely displaced to the left, and the first mobile apparatus needs to be controlled to move with an absolute value of the first movement distance to the left, namely, $|\Delta F|$; if $\Delta F$ is 0, it indicates that the tab is not displaced, and the first mobile apparatus may not move.

It should be noted that the first mobile apparatus is in a reference position before starting. The reference position has been determined based on the reference battery cell and stored in the tab image acquisition system.

Step 6. Determine a photographing start position $S_{start1}$ and a photographing end position $S_{end1}$ of the second mobile apparatus, where $S_{start1}=S0+\Delta E=S0+E-E1$, and $S_{end1}=S1+\Delta F=S1+F1-F$.

Step 7. Determine the number of photographing times N1 of the image acquisition module, where $N1=(S_{end1}-S_{start1})/G$.

Step 8. Control the second mobile apparatus to move from the photographing start position $S_{start1}$ to the photographing end position $S_{end1}$, and photograph, by the image acquisition module, once every time the second mobile apparatus moves the preset distance G to obtain multiple images of the tab.

In this embodiment of this application, when the second mobile apparatus reaches the photographing end position $S_{end1}$, the tab image acquisition system transmits a photographing end signal to a computer system. After receiving the signal, the computer system sends to an AI system N1 images obtained by means of photographing by the image acquisition module from the photographing start position $S_{start1}$ to the photographing end position $S_{end1}$. By using feature extraction and image fusion algorithms, the AI system fuses the N1 images into a photo that can clearly reflect an edge contour of each layer of the tab. Then, a tab folding algorithm of the AI system is used to identify a folding defect of the tab.

In this embodiment of this application, the right side surface of the left tab is used as an example of description. Images of a left side surface of the left tab or the right tab can be acquired by using the same method, which is not described herein again.

A battery cell includes two tabs, and a tab image acquisition device includes two image acquisition apparatuses. During an image acquisition process, the two image acquisition apparatuses acquire surfaces of the two tabs on the same side respectively. For example, the right side surfaces are acquired first. After the right side surfaces of the two tabs are acquired, the battery cell moves to a next image acquisition device. The image acquisition device also includes two image acquisition apparatuses, where the two image acquisition apparatuses acquire the surfaces of the two tabs on the same side respectively, for example, the left side surfaces. In this way, one tab image acquisition device can acquire two side surfaces of two tabs.

In conclusion, it should be noted that the foregoing embodiments are merely intended to describe the technical solutions of this application, rather than to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application. All these modifications and replacements should fall within the scope of claims and specification of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A tab image acquisition device, comprising an image acquisition apparatus, wherein the image acquisition apparatus comprises:
   a first mounting plate, movable in a first direction;
   a second mounting plate, movable in a second direction, wherein the second direction intersects with the first direction;
   a camera assembly, installed on the second mounting plate; and
   a prism module, installed on the first mounting plate,
   wherein the first mounting plate is movable in the first direction by a first driving mechanism, and the second mounting plate is movable in the second direction by a second driving mechanism, and the second driving mechanism is mounted on the first mounting plate;
   wherein the prism module has a reflective surface, and the reflective surface is configured to change an angle of an incident light beam on a tab whose image is to be acquired, so that the incident light beam enters the camera assembly; and
   wherein the prism module comprises:
      a telescopic cylinder, installed on the first mounting plate, wherein a telescoping direction of the telescopic cylinder is a third direction, and the third direction intersects with both the first direction and the second direction; and
      a prism body, installed on the telescopic cylinder, wherein the reflective surface is provided on the prism body.

2. The fab image acquisition device according to claim 1, wherein the first driving mechanism comprises:
   a first driving motor; and
   a first rail, wherein the first rail extends in the first direction;
   wherein the first mounting plate is provided with a first mounting lug, the first mounting lug is movably disposed inside the first rail, and
   wherein the first mounting plate is movable in the first direction by the first driving motor.

3. The tab image acquisition device according to claim 2, wherein the second driving mechanism comprises;
   a second driving motor; and
   a second rail, wherein the second rail extends in the second direction;
   wherein the second mounting plate is provided with a second mounting lug, the second mounting lug is movably disposed inside the second rail, and
   wherein the second mounting plate is movable in the second direction by the second driving motor.

4. The tab image acquisition device according to claim 1, wherein the first direction is perpendicular to the second direction.

5. The tab image acquisition device according to claim 4, wherein an included angle between the reflective surface and the first direction is 45°.

6. The tab image acquisition device according to claim 1, wherein the first direction, the second direction, and the third direction are perpendicular to each other.

7. The tab image acquisition device according to claim 1, wherein the prism body is a total reflecting prism.

8. The tab image acquisition device according to claim 1, wherein the image acquisition apparatus further comprises:
   a first light source, installed on the first mounting plate, wherein a light-emitting surface of the first light source overlaps with at least part of the tab.

9. The tab image acquisition device according to claim 8, wherein the first light source is an are light source.

10. The tab image acquisition device according to claim 1, wherein the tab image acquisition device further comprises a displacement detection apparatus, and the displacement detection apparatus is configured to detect a displacement amplitude of the tab in the first direction.

11. The tab image acquisition device according to claim 10, wherein the displacement detection apparatus comprises at least one camera.

12. The tab image acquisition device according to claim 11, wherein the displacement detection apparatus further comprises at least one second light source.

13. A tab image acquisition system, comprising at least one pair of the tab image acquisition devices according to claim 1.

* * * * *